(12) United States Patent
Dock

(10) Patent No.: US 8,616,635 B2
(45) Date of Patent: Dec. 31, 2013

(54) ANTI-CRASH SEAT FOR A VEHICLE

(75) Inventor: Laurent Dock, Aix en Provence (FR)

(73) Assignee: Eurocopter, Marignane Cedex (FR)

( * ) Notice: Subject to any disclaimer, the term of this patent is extended or adjusted under 35 U.S.C. 154(b) by 311 days.

(21) Appl. No.: 13/028,793

(22) Filed: Feb. 16, 2011

(65) Prior Publication Data

US 2011/0204685 A1  Aug. 25, 2011

(30) Foreign Application Priority Data

Feb. 23, 2010 (FR) ...................................... 10 00718

(51) Int. Cl.
*B60N 2/42* (2006.01)

(52) U.S. Cl.
USPC .................................. 297/216.16; 297/216.1

(58) Field of Classification Search
USPC .............................. 297/216.1, 216.16, 344.12
See application file for complete search history.

(56) References Cited

U.S. PATENT DOCUMENTS

| 2,930,613 | A | | 3/1960 | Katz |
|---|---|---|---|---|
| 3,420,475 | A | | 1/1969 | Castillo et al. |
| 4,003,534 | A | | 1/1977 | Kenigsberg et al. |
| 4,204,659 | A | * | 5/1980 | Phillips et al. ................ 248/562 |
| 4,523,730 | A | | 6/1985 | Martin |
| 6,886,650 | B2 | * | 5/2005 | Bremner .................... 180/89.13 |
| 7,077,471 | B2 | * | 7/2006 | Schumann et al. ........ 297/216.1 |
| 2008/0015753 | A1 | * | 1/2008 | Wereley et al. ................. 701/45 |
| 2008/0156602 | A1 | * | 7/2008 | Hiemenz et al. ........... 188/267.1 |

FOREIGN PATENT DOCUMENTS

| DE | 102008056661 A1 | 5/2009 |
|---|---|---|
| EP | 0078479 A1 | 5/1983 |
| EP | 0682191 A1 | 11/1995 |
| EP | 2113457 A1 | 11/2009 |

\* cited by examiner

*Primary Examiner* — Philip Gabler
(74) *Attorney, Agent, or Firm* — Brooks Kushman P.C.

(57) ABSTRACT

An anti-crash seat (1) for a vehicle, the seat comprising a bucket (2) and a frame (6), said bucket (2) being provided with a seat proper (3) and with a back (4) for receiving a person. Said seat (1) includes crash energy absorber means (10) and antivibration means (20). The seat also includes inhibitor means (30) for inhibiting said antivibration means (20) so as to neutralize the antivibration means (20) when the seat (1) is subjected to acceleration towards the floor that is greater than a predetermined threshold.

11 Claims, 2 Drawing Sheets

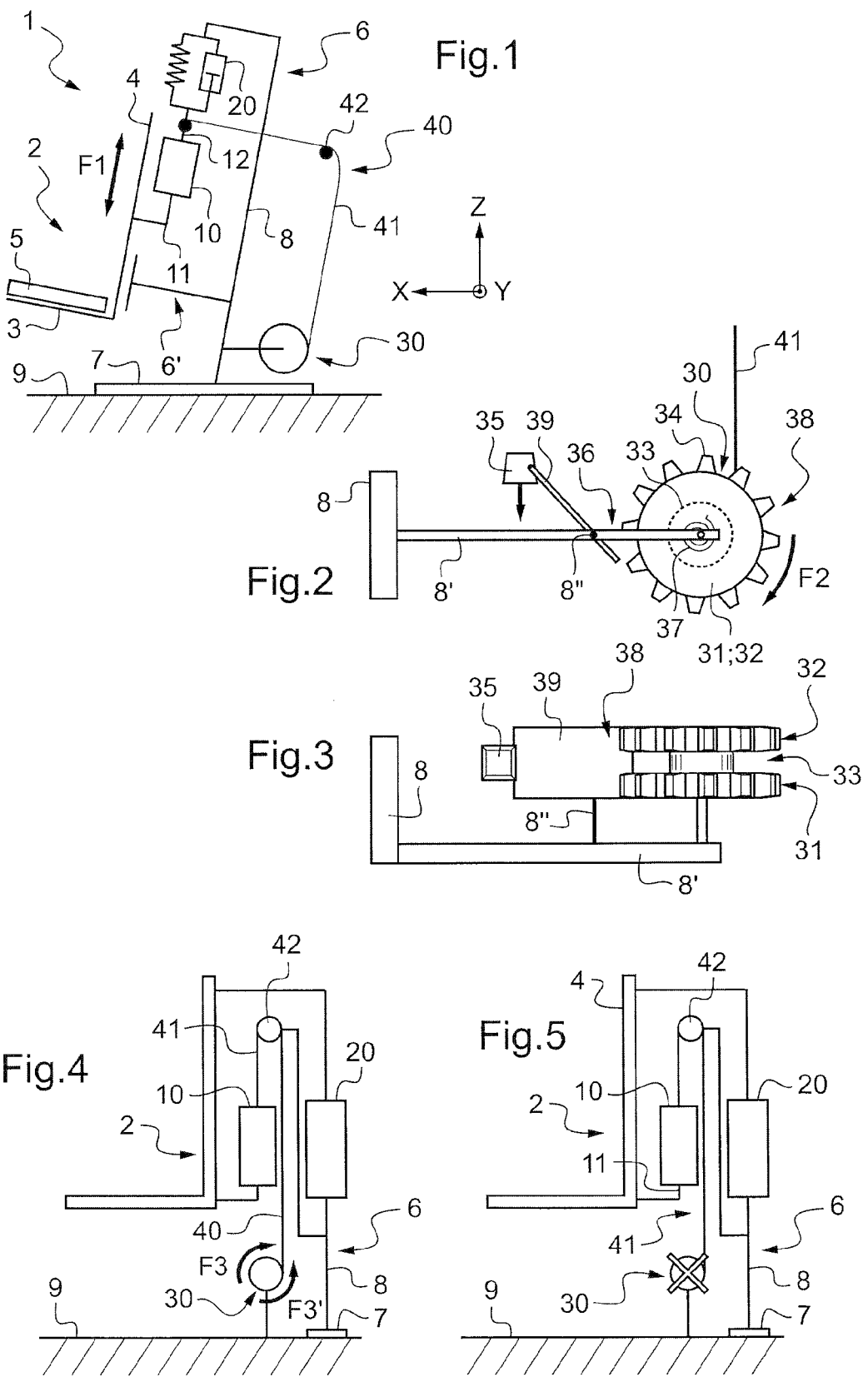

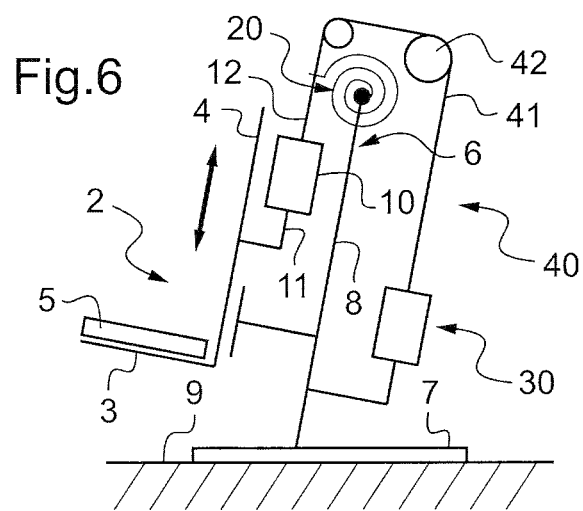
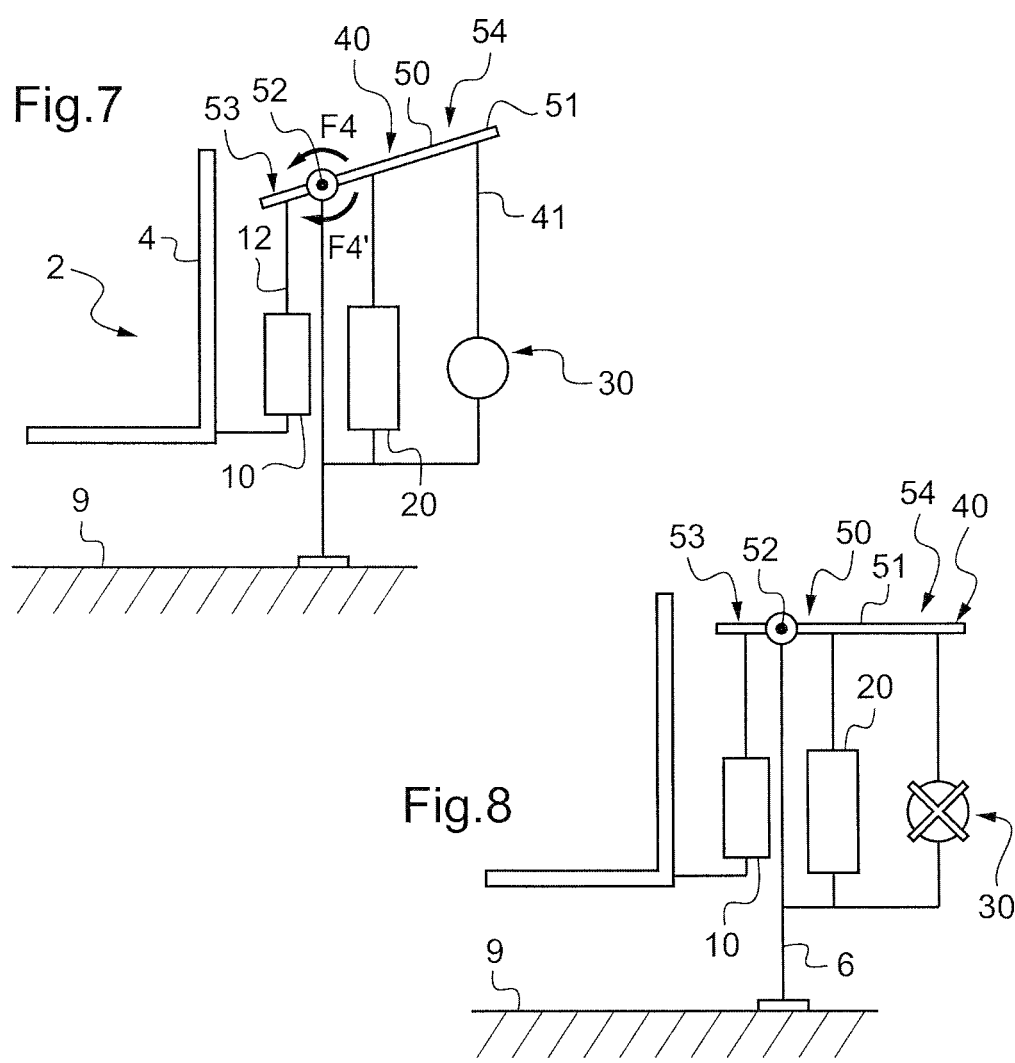

ANTI-CRASH SEAT FOR A VEHICLE

CROSS REFERENCE TO RELATED APPLICATION

This application claims the benefit of FR 10 00718 filed on Feb. 23, 2010. The disclosure of which is incorporated in its entirety by reference herein.

BACKGROUND OF THE INVENTION (1) Field of the Invention

The present invention relates in particular to the field of powered aircraft, in particular airplanes and rotorcraft, and more particularly to the field of accessories for fitting to such aircraft. The invention provides an anti-crash seat for a vehicle, and in particular for powered aircraft. The seat includes means for protecting a passenger in the event of a violent impact and/or of a sudden change in the speed of the aircraft, in particular during a crash.

(2) Description of Related Art

Seats for powered aircraft such as airplanes, rotorcraft, and more particularly helicopters or analogous powered aircraft incorporate means for protecting passengers installed on the seats in the event of a crash. The term "passenger" should be understood as designating any person on board the aircraft, whether a pilot or a person being transported. Such protection means are commonly constituted by energy absorber means that are suitable for compensating the stresses to which the seat is subjected when it is subjected to a violent impact and/or to a sudden deceleration, in particular in the event of a crash.

In a common embodiment, the seat associates a frame and a bucket, itself made up of a seat proper with a back extending upwards therefrom. The frame is anchored to the floor of the aircraft via longitudinally extending members and it includes upright legs that are secured to the longitudinally extending members and that together carry the bucket.

According to document EP 0 814 020, an anti-crash seat for a vehicle comprises a bucket for receiving a person and a frame for connecting the bucket to the floor of the vehicle, the bucket being provided with a seat proper and with a back.

The frame is provided with first and second feet, each extended by an upright support leg having a rib. In addition, the seat is provided with one fastener element per upright leg, the fastener elements being supported by the back of the bucket. Each rib is then engaged in a channel in the associated fastener element, with the portion of the rib situated above the fastener element having a cross-section that is smaller than the section of the portion of the rib that is situated below the fastener element.

In the event of the vehicle, e.g. a helicopter, crashing, the downward movement of the vehicle is stopped suddenly and violently when the vehicle makes contact with the ground. Because of its inertia, the bucket with the person sitting on the bucket tends to continue moving downwards, and the fastener elements slide along the ribs which then act as guide means. In addition, the fastener elements plane away the ribs as they move downwards, thereby enabling said rib to act as an energy absorber, specifically absorbing the energy that comes from the kinetic energy of the bucket plus the person sitting on it.

Consequently, the deceleration to which the bucket and said person are subjected is significantly reduced by the ribs of the upright support legs. That first seat thus provides means that act both as guide means and as energy absorber means, with the removal of material from the energy absorber means being found to be highly effective.

Nevertheless, after the crash, the supporting upright legs and the fastener elements need to be replaced, and that gives rise to non-negligible expense.

Document EP 0 078 479 discloses a second anti-crash seat provided with a first structure comprising a frame and a bucket fastened to the frame. Furthermore, the second seat is provided with two pillars suitable for being fastened to a framework of a vehicle.

The frame possesses two sleeves, each sleeve being suitable for sliding on a respective pillar. The pillars then act as guide means.

In order to prevent the sleeves from sliding under normal conditions, i.e. when not in a crash situation, the seat has a plurality of bars fastened via their top ends to cap members arranged at the top ends of the pillars. More precisely, the seat has one cap member per pillar, each cap member being fitted with four bars. Furthermore, each pillar is surrounded by a drawing die itself surrounded by a collar. The bars of a pillar pass through a passage formed in the die of the pillar. It should be observed that the diameter of each bar beneath the die is greater than the diameter of the passage through the die.

Thus, as for the first seat, when the bucket moves down quickly as a result of a crash or a hard landing, the bars are deformed by the die, thereby enabling a large quantity of energy to be absorbed. In contrast, the guide means, namely the pillars, are dissociated from the energy absorber means, namely the bars. After a hard landing, it is only the bars and the dies that need to be changed, thereby limiting cost.

Nevertheless, such replacement requires the seat to be almost completely dismantled. Furthermore, the costs of fabricating the seat remain relatively high because of its close manufacturing tolerances.

According to document FR 2 930 520, an anti-crash seat for a vehicle comprises a bucket and a frame for connecting the bucket to the floor of the vehicle, the bucket being provided with a seat proper and a back for receiving a person, the frame being provided with first and second feet suitable for fastening to the floor on either side of the bucket, said first and second feet being mechanically connected to first and second upright legs supporting the back. In addition, that seat has support means secured to the first and second upright support legs and guide means for guiding the bucket in translation and energy absorber means that are distinct, the guide means and the energy absorber means each co-operating with control means secured to the back of the seat bucket, the guide means co-operating with the control means to guide the movement of the bucket in translation in a predetermined direction during a crash, the energy absorber means co-operating with the control means and with the support means to absorb the kinetic energy of the seat in order to control the deceleration to which the person sitting on the seat is subjected.

Consequently, during a crash, the energy absorber means deforms, with a fraction of the energy absorber means being held stationary by the support means while the control means pull on another fraction of the energy absorber means. The elastic or plastic deformation of the energy absorber means then enables it to absorb energy.

The seat thus serves to protect a sitting person in the event of a vertical crash.

Furthermore, on a rotorcraft, and in particular a helicopter, the seat is heavily stressed in terms of vibration. Under such circumstances, the seat proper is generally covered in a foam lining in order to limit vibratory stress.

Thus, the seat has crash energy absorber means and anti-vibration means, i.e. the foam. It can be understood that throughout the description the term "energy absorber means" designates means suitable for absorbing the energy that results from a strong acceleration or deceleration during a crash, in particular to protect a person's lumbar region, and the term "antivibration means" designates means serving to avoid transmitting vibration from the vehicle to said person in order to improve comfort.

Although effective, if the antivibration means are stressed little by the weight of the passenger, the crash energy absorber means are activated only after the residual stroke of the vibration absorber means has been used up. In other words, at the moment of a crash, the person moves and stresses the antivibration means, i.e. flattens the foam. The person is thus subjected to an increase in speed before beginning to stress the crash energy absorber means. During a crash, this movement in translation of the person is stopped suddenly. This gives rise to a lumbar force peak when the crash energy absorber means are initially stressed. In compliance with the requirements for certification and in particular the rule known under the name "FAR part 29" that is applicable to rotorcraft, the force peak is acceptable so long as it remains below a specified maximum peak.

Manufacturers thus take that maximum peak into consideration, e.g. when dimensioning the foam.

Document U.S. Pat. No. 3,420,475 describes a seat provided with a piston suitable for sliding in a first cylinder acting as antivibration means, the first cylinder being placed in a second cylinder acting as crash energy absorber means. Although attractive, that solution is also likely to generate a lumbar force peak that needs to be kept within an acceptable limit.

Document FR 2 397 981 proposes a seat fastened to two sliders by a plurality of dampers, each slider being arranged on a rail fastened to a floor. In addition, the connection between a damper and a slider includes antivibration means provided with a block including an element of elastic material associated with a mount. That device can avoid generating lumbar force peaks, but it presents the drawbacks of being relatively bulky and heavy.

Finally, it should be observed that document U.S. Pat. No. 4,003,534 describes a seat provided with means for combating lateral vibration, as opposed to so-called "vertical" vibration directed in a direction that is substantially parallel to the seat back.

The state of the art further includes the following documents: US 2008/015753, U.S. Pat. No. 4,523,730, EP 2 113 457, EP 0 682 191, and DE 10 2008 056661. Document US 2008/015753 provides in particular antivibration means that are fastened on a base, the antivibration means co-operating with means for separating the antivibration means from the base.

SUMMARY OF THE INVENTION

An object of the present invention is thus to propose a vehicle seat that is suitable for performing an antivibration function and an anti-crash function without giving rise to lumbar force peaks, or at worst giving rise to a lumbar force peak that is thoroughly under control, the seat also presenting good compactness and weight.

According to the invention, an anti-crash seat for a vehicle comprises a bucket and a frame fastened to a floor for carrying said bucket, said bucket being provided with a seat proper and with a back for receiving a person, said seat including crash energy absorber means and antivibration means. The energy absorber means are suitable in particular for absorbing the energy that results from a crash by plastic or elastic deformation of a member, e.g. when the bucket moves towards the floor, in a bucket guide direction that is optionally parallel to the back. It can be understood that the term "guide direction" designates the direction followed by the bucket, possibly under the effect of seat guide means.

The seat is remarkable in particular in that it includes inhibitor means for inhibiting said antivibration means to neutralize the antivibration means when the bucket is subjected to acceleration towards the floor that is greater than a predetermined threshold.

Such acceleration is sometimes said to be "downward" acceleration.

Thus, the bucket is suspended from the frame via at least the crash energy absorber means, e.g. means of the type described in document FR 2 930 613, the frame being fastened to a floor such as a floor of an aircraft of the rotorcraft type. The elastic or plastic deformation of the energy absorber means then enables them to absorb energy.

Furthermore, when the acceleration of the bucket towards the floor is below the predetermined threshold, the antivibration means filter the vibration transmitted by the floor to the seat so as to improve the comfort of the person sitting on said seat. However, above the threshold, the inhibitor means inhibit the antivibration means.

During a crash, certain conventional seat buckets tend to move and are then stopped suddenly, thereby giving rise to a lumbar force peak, which peak must be less than several thousand newtons in order to comply with the certification standard known under the name "FAR 29". More precisely, reference may be made to paragraph 29.562 of the certification standard "FAR 29".

However, in the invention, the bucket moves little, and indeed need not move at all before it is blocked insofar as the antivibration means are inhibited at the time of a crash. The invention thus allows both the antivibration function and the anti-crash function to be performed, but without giving rise to lumbar force peaks, or giving rise at worst to a force peak that is under control.

It should be observed that the manufacturer determines the predetermined threshold as a function of the standards to be satisfied.

For example, the standards provide crash levels to be satisfied, a downward acceleration of 30 g at 60° relative to the horizontal according to FAR 29.562 (b), where "g" designates the acceleration due to gravity. Under such circumstances, the predetermined threshold is advantageously adjusted as a function of the shape of the seat, of the frequencies and/or amplitudes of the vibration to be filtered, of the shape of the cushion on the seat proper, and of the performance of the energy absorber, e.g. 4 g. Under such circumstances, an acceleration of 5 g causes the bucket to move towards the floor and also inhibits the antivibration means.

In another method, it is conceivable to use the maximum acceptable peak mentioned in FAR 29.562 c). The manufacturer then determines by testing or calculation the value of bucket acceleration that generates such a maximum peak, said value being the predetermined threshold above which the antivibration means are inhibited.

The invention may also include one or more of the following additional characteristics.

For example, the energy absorber means include a first end fastened to the bucket and a second end movable relative to the frame, the inhibitor means being linked to the second end by link means to block the second end when the bucket is subjected to acceleration towards the floor that is greater than the predetermined threshold.

Thus, by blocking the second end of the energy absorber means, the inhibitor means prevent the bucket from moving and thereby inhibit the antivibration means.

It should be observed that the inhibitor means may be linked to the second end equally well directly or indirectly depending on the embodiment.

In the first embodiment, the antivibration means and the energy absorber means are arranged in parallel. The antivibration means are then fastened firstly to the bucket, and secondly to a member that is stationary relative to the bucket, i.e. equally well relative to the frame or to the floor that is fastened to the frame, for example.

The antivibration means may be of any type, and possibly of the piston damper type, rotary damper type, torsion tube type, magnetic damper type, electrical damper type, or some other type.

Furthermore, the second end is optionally suspended from a link of the link means the link linking the second end to the inhibitor means. Beyond the predetermined threshold, the inhibitor means prevent any movement of the link, whereas below the predetermined threshold the link is free to move.

In a second embodiment, the antivibration means and the energy absorber means are arranged in series.

Said antivibration means are then firstly fastened to a member that is stationary relative to the bucket, i.e. equally well to the frame or to the floor fastened to the frame, and secondly they are linked to said second end.

More particularly, said antivibration means are equally well linked directly to the second end or linked indirectly to said second end by connection means.

In a preferred variant of this second embodiment, the antivibration means are linked directly to the second end. The antivibration means are antivibration means stressed in twisting arranged on the frame and linked to the second end.

The antivibration means may be of any type, and possibly of the rotary damper type, torsion tube type, magnetic damper type, electrical damper type, or some other type.

In another variant, the antivibration means are connected indirectly to the second end by connection means. The antivibration means are firstly fastened to a member that is stationary relative to the bucket, i.e. equally well to the frame or to the floor fastened to the frame for example, and secondly they are linked to the second end by a rocker beam of connection means hinged to the frame by a hinge. The hinge is arranged between a first zone of the beam and a second zone of the beam, the second end being fastened to the first zone and the antivibration means being fastened to the second zone.

The beam also constitutes link means linking the inhibitor means to the second end, the inhibitor means being fastened to the second zone of the beam.

Thus, in normal operation, i.e. below said predetermined threshold, the beam rocks relative to the frame, the rocking movement of the beam being damped by the antivibration means.

In contrast, when it is detected that the acceleration of the bucket towards the floor is greater than the predetermined threshold, the inhibitor means block the rocking movement of the beam, and consequently block the movement of the second end of the energy absorber means.

Whatever the embodiment, the inhibitor means comprise a winder that co-operates with a link of the link means, the inhibitor means comprising blocker means for blocking the winder when the bucket is subjected to acceleration towards the floor that is greater than a predetermined threshold.

For example, the inhibitor means may be of the type used on car safety belts having a flyweight suitable for co-operating with the teeth of the winder.

More precisely, the winder has two toothed end plates on either side of a spool on which the link of the link means is wound. Furthermore, a flyweight is provided that is secured to blocker means. When the acceleration of the bucket towards the floor is greater than the predetermined threshold, the flyweight moves, thereby moving the blocker means against the teeth of the end plates. The winder can then no longer rotate, thereby blocking the link.

In another variant, the winder is provided with a brake controlled by a processor connected to an impact sensor. When the sensor measures acceleration of the bucket greater than the predetermined threshold, the processor causes the brake to be applied.

The inhibitor means may equally well be fastened to the frame or to the floor.

In addition to a seat, the invention also provides a method of protecting a person sitting on a seat of the invention as described above against vibration and impact.

During this method, the antivibration means are activated in normal operation, namely when the bucket is subjected to accelerations towards the floor that are below the predetermined threshold, and said antivibration means are inhibited when the bucket of said seat is subjected to acceleration towards the floor that is greater than a predetermined threshold so as to allow only crash energy absorber means to act.

BRIEF DESCRIPTION OF THE DRAWINGS

The invention and its advantages appear in greater detail in the context of the following description with embodiments given by way of illustration and with reference to the accompanying figures, in which:

FIG. 1 is a view explaining the operation of the invention;

FIG. 2 is a side view showing inhibitor means;

FIG. 3 is a plan view showing inhibitor means;

FIGS. 4 and 5 are views showing and explaining a seat in a first embodiment;

FIG. 6 is a view showing a first variant of a second embodiment; and

FIGS. 7 and 8 are views showing a second variant of a second embodiment.

Elements that are present in more than one of the figures are given the same references in each of them.

DETAILED DESCRIPTION OF THE PREFERRED EMBODIMENT

FIG. 1 shows an anti-crash seat 1 for a vehicle, and more particularly a seat for an aircraft of the rotorcraft type, for example.

The seat 1 comprises a bucket 2 suspended from a frame 6 standing on the floor 9 of the aircraft. The bucket 2 comprises a seat proper 3 situated substantially in a first plane X, Y and a back 4 situated substantially in a second plane Y, Z. It should be observed that the three axes X, Y, Z defining the first and second planes may correspond to the reference axes of the aircraft or they may present angles relative to said reference axes, the first reference axis corresponding to the roll axis of the aircraft, the second reference axis corresponding to the pitching axis of the aircraft, and the third reference axis corresponding to the yaw axis of the aircraft.

By way of example, the frame 6 comprises a first foot 7 extended by a first upright leg 8, and also a second foot extended by a second upright leg that are not shown in FIG. 1 for convenience.

The bucket 2 is then suspended from the frame 6, and more particularly the first foot 7 and the second foot.

It should be observed that the frame 6 may be fitted with guide means 6' for guiding the bucket 2 relative to the frame 6 in a guide direction.

Furthermore, the seat 1 is provided with crash energy absorber means 10 and with antivibration means 20 that are dissociated from each other.

The function of the energy absorber means 10 is to absorb the energy that results from a crash, and in particular from an acceleration of the bucket directed towards the floor and above a predetermined threshold, said acceleration being parallel to the guide direction of the bucket. The absorber means comprise conventional means extending from a first end 11 secured to the back 4 of the bucket 2 to a second end 12 that is movable relative to the frame 6, being capable of moving along double-headed arrow F1 in a direction substantially parallel to the third axis Z.

The function of the antivibration means 20 is to filter the vibration transmitted by the floor 9 to the bucket 2 via the frame 6 in a direction that is parallel to the guide direction. By way of example, the antivibration means 20 may comprise a hydraulic or pneumatic piston damper, an electric damper, a rotary damper, a torsion bar, a torsion spring, a magnetic damper, and assembly having spring type resilient means in parallel with a piston damper, or any other type of antivibration means.

The damper means are fastened to a member that is stationary relative to the bucket 2, i.e. equally well either to the floor 9 or the frame 6, and for example to an upright leg 8 of the frame 6, as shown in FIG. 1. In addition, depending on the embodiment, the damper means are fastened either to the bucket 2 or to the second end 12 of the energy absorber means 10.

The seat 6 also includes inhibitor means 30 for inhibiting the antivibration means 20 when the bucket 2 is subjected to acceleration towards the floor that is greater than a predetermined threshold, i.e. during a crash. It is recalled that crash conditions are set by certification authorities, for example by means of certification rule FAR 29. For example, the predetermined threshold is advantageously set at 4 g.

The inhibitor means 30 are thus connected to the second end 12 by link means 40, e.g. comprising a link 41, a strap optionally co-operating with at least one deflector means 42. In addition, depending on the variant, the inhibitor means are fastened to a member that is stationary relative to the bucket 2, i.e. equally well either the floor 9 or the frame 6, and for example to an upright leg 8 of the frame 6, as shown in FIG. 1.

In normal operation, i.e. when the bucket is subjected to acceleration towards the floor that is below the threshold predetermined by the manufacturer, the vibration of the aircraft imparts oscillation to the bucket 2 and to the second end 12 of the energy absorber means 10 along double-headed arrow F1. This movement of the bucket 2 is filtered by the antivibration means 20 that tend to cancel said vibration in order to improve the comfort of the person sitting on the seat 1.

Under such circumstances, there is no need to provide foam of great thickness on the seat proper 3, with optional foam 5 of small thickness sufficing to provide comfort. The foam 5 serves to absorb vibration in a plane parallel to the seat proper 3.

During a crash, the bucket is subjected to acceleration towards the floor that is above the threshold predetermined by the manufacturer. The inhibitor means are then activated to block the link means 40 and consequently the second end 12.

Under such circumstances, the bucket 2 stresses the energy absorber means 10 by moving the first end 11 away from the second end 12.

Since the seat and the person have not moved prior to the energy absorber means 10 being stressed, the person does not feel a major peak of lumbar force. It should be observed that the invention may allow the person to move beforehand, thereby giving rise to a force peak, but that is kept under full control and that is authorized by the certification authorities.

FIG. 2 shows a mechanical embodiment of the inhibitor means 30.

The mechanical inhibitor means possess a winder 38, e.g. provided with two peripheral cheekplates 31 and each having teeth 34 and lying on either side of a central portion 33. It should be observed that the second cheekplate 32 and the central portion 33 can be seen in FIG. 3.

The winder 38 is then secured to the frame 6, for example, possibly via a fastener arm 8' connecting it to an upright leg 8.

In addition, the winder 38 may include a return spring 37 tending to cause the winder 38 to turn in the direction of arrow F2 so as to tension the link 41 wound around the central portion 33.

Furthermore, the inhibitor means are provided with blocker means 36. By way of example, the blocker means comprise a first end portion of a bar 39 mounted to pivot about a pivot point 8" of the fastener arm 8', while a second end portion of said bar 39 has a flyweight 35.

FIG. 3 is a plan view of such inhibitor means.

With reference to FIG. 2, when the bucket is subjected to acceleration towards the floor greater than the predetermined threshold, the bar 39 pivots. The blocker means 36 take up a position between two adjacent teeth of each of the cheekplates 32 and 33. The winder and the second end are then blocked in a given position.

This blocking of the second end thus inhibits operation of the antivibration means 20.

It can be understood that other inhibitor means could be devised. Thus, it is possible to provide a winder that has a brake, the brake being controlled by a processor as a function of an electrical signal coming from a conventional impact sensor.

FIGS. 4 and 5 relate to a first embodiment of the invention.

In this first embodiment, the antivibration means 20 are arranged in parallel relative to the energy absorber means 10, the antivibration means 20 being fastened to the bucket 2 and to a member that is stationary relative to the bucket 2, specifically an upright leg 8 of the frame 6 in the example shown.

Furthermore, the second end 12 is suspended from the link 41 of the link means 40, the link passing around deflector means 42 of the frame 6.

In normal operation, when the bucket tends to move towards the floor, the second end pulls on the link and unwinds the link 41 from the winder 38 of the inhibitor means 30 in the direction of arrow F3', the inhibitor means also being fastened to the floor 9. Simultaneously, the antivibration means 20 are stressed in compression.

Conversely, when the bucket tends to move away from the floor 9, the second end exerts less traction on the link 41, with the winder winding in the link 41 in the direction of arrow F3 in order to keep it tensioned. Simultaneously, the antivibration means 20 are stressed in extension.

With reference to FIG. 5, from an acceleration of the bucket towards the floor that is greater than a predetermined threshold, the inhibitor means 30 block. For example, blocker means 36 block the winder 38 of the inhibitor means. It is then impossible to pull on the link 41, thereby blocking the second end in a given position.

Movement of the bucket 2 in translation towards the floor 9 thus stresses the energy absorber means 10, with the back 4 pulling on the first end 11.

With reference to FIGS. 6 to 8, in a second embodiment, the antivibration means 20 are arranged in series relative to the energy absorber means 10, the antivibration means 20 being fastened firstly directly or indirectly to the second end 12 and secondly to a member that is stationary relative to the bucket 2.

In the first variant of the second embodiment as shown in FIG. 6, the antivibration means 20 are fastened directly to the second end 12 of the energy absorber means 10, for example, the antivibration means comprise a spring that is firstly arranged on a joining bar connecting together the first and second upright legs of the frame, and is secondly fastened to the second end 12.

In an equivalent variant that is not shown, the antivibration means may be a torsion bar connecting together the first and second upright legs of the frame and fastened to the second end 12.

In addition, the second end 12 is fastened to a link 41 of link means 40, the link means being attached to inhibitor means 30 fastened to the frame 6. It can be understood that the inhibitor means 30 may, in a variant, be fastened to any other member that is stationary relative to the bucket 2.

In the second variant of the second embodiment, as shown in FIG. 6, the antivibration means 20 are fastened indirectly to the second end 12 of the energy absorber means 10 by connection means 50.

More precisely, the connection means 50 are provided with a beam 51 extending from a first zone 53 to a second zone 54 on opposite sides of a hinge 52 on the frame 6.

The second end 12 of the energy absorber means 10 is then fastened to the first zone 53, the second zone 54 being fastened to the antivibration means 20 and to a link 41 of inhibitor means 30. The link means 40 of the inhibitor means 30 then comprise in succession the link 41 and the beam 51.

In normal operation, when the bucket tends to move towards the floor, the second end pulls on the beam 51, which tilts in the direction of arrow F4. The second 54 of the beam 51 moves away from the floor 9 and unwinds the link 41 from the winder of the inhibitor means 30. Simultaneously, the antivibration means 20 are stressed in extension.

Conversely, when the bucket tends to move away from the floor 9, the second end exerts less traction on the link 41, with the winder winding in the link 41 in order to keep it tensioned. Simultaneously, the antivibration means 20 are stressed in compression.

With reference to FIG. 8, as from acceleration of the bucket that is greater than a predetermined threshold, the inhibitor means 30 become blocked. The beam 51 can no longer tilt about the hinge 52. The second end 12 is then held in a given position, the bucket then stretching the energy absorber means 10 via the first end of the energy absorber means 10.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. An anti-crash seat for a vehicle, the seat comprising a bucket and a frame fastened to a floor for carrying said bucket, said bucket being provided with a seat bottom and with a back for receiving a person, said seat including crash energy absorber means and antivibration means, wherein the seat includes inhibitor means for inhibiting said antivibration means to neutralize the antivibration means when the bucket is subjected to acceleration towards the floor that is greater than a predetermined threshold, wherein said crash energy absorber means include a first end fastened to the bucket and a second end movable relative to said frame, said inhibitor means being linked to said second end by link means to block said second end when the bucket is subjected to acceleration towards the floor that is greater than said predetermined threshold.

2. A seat according to claim 1, wherein said antivibration means are fastened firstly to the bucket, and secondly to a member that is stationary relative to the bucket.

3. A seat according to claim 1, wherein said second end is suspended from a link of the link means said link linking the second end to the inhibitor means.

4. A seat according to claim 1, wherein said antivibration means are firstly fastened to a member that is stationary relative to the bucket, and are secondly linked to a second end of said crash energy absorber means.

5. A seat according to claim 4, wherein said antivibration means are equally well linked directly to the second end or linked indirectly to said second end by connection means.

6. A seat according to claim 4, wherein said antivibration means are antivibration means stressed in twisting arranged on said frame and linked to the second end.

7. A seat according to claim 4, wherein said antivibration means are firstly fastened to a member that is stationary relative to the bucket and are secondly linked to said second end by a rocker beam of connection means hinged to the frame by a hinge, said hinge being arranged between a first zone of the beam and a second zone of the beam, said second end being fastened to said first zone and said antivibration means being fastened to said second zone.

8. A seat according to claim 7, wherein said beam also constitutes link means linking said inhibitor means to said second end, said inhibitor means being fastened to said second zone of the beam.

9. An anti-crash seat for a vehicle, the seat comprising a bucket and a frame fastened to a floor for carrying said bucket, said bucket being provided with a seat bottom and with a back for receiving a person, said seat including crash energy absorber means and antivibration means, wherein the seat includes inhibitor means for inhibiting said antivibration means to neutralize the antivibration means when the bucket is subjected to acceleration towards the floor that is greater than a predetermined threshold, wherein said inhibitor means comprise a winder that co-operates with a link of a link means, said inhibitor means comprising blocker means for blocking said winder when the bucket is subjected to acceleration towards the floor that is greater than a predetermined threshold.

10. A method of protecting a person sitting on a seat against vibration and impact, the seat comprising a bucket and a frame fastened to a floor for carrying said bucket, said bucket being provided with a seat bottom and with a back for receiving a person, said seat including crash energy absorber means and antivibration means, wherein the seat includes inhibitor means for inhibiting said antivibration means to neutralize the antivibration means when the bucket is subjected to acceleration towards the floor that is greater than a predetermined threshold, and wherein said inhibitor means comprise a winder that co-operates with a link of a link means, said inhibitor means comprising blocker means for blocking said winder when the bucket is subjected to acceleration towards the floor that is greater than a predetermined threshold, in which method the antivibration means are activated in normal operation and said antivibration means are inhibited when the bucket of said seat is subjected to acceleration towards the floor that is greater than a predetermined threshold so as to allow only crash energy absorber means to act.

11. A method of protecting a person sitting on a seat against vibration and impact, the seat comprising a bucket and a frame fastened to a floor for carrying said bucket, said bucket being provided with a seat bottom and with a back for receiving a person, said seat including crash energy absorber means and antivibration means, wherein the seat includes inhibitor means for inhibiting said antivibration means to neutralize the antivibration means when the bucket is subjected to acceleration towards the floor that is greater than a predetermined threshold, and wherein said crash energy absorber means include a first end fastened to the bucket and a second end movable relative to said frame, said inhibitor means being linked to said second end by link means to block said second end when the bucket is subjected to acceleration towards the floor that is greater than said predetermined threshold, in which method the antivibration means are activated in normal operation and said antivibration means are inhibited when the bucket of said seat is subjected to acceleration towards the floor that is greater than a predetermined threshold so as to allow only crash energy absorber means to act.

* * * * *